(12) United States Patent
Sobel et al.

(10) Patent No.: US 7,694,343 B2
(45) Date of Patent: Apr. 6, 2010

(54) CLIENT COMPLIANCY IN A NAT ENVIRONMENT

(75) Inventors: William E. Sobel, Stevenson Ranch, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1154 days.

(21) Appl. No.: 11/271,610

(22) Filed: Nov. 9, 2005

(65) Prior Publication Data

US 2006/0075140 A1 Apr. 6, 2006

Related U.S. Application Data

(63) Continuation-in-part of application No. 10/305,622, filed on Nov. 27, 2002, now Pat. No. 7,249,187.

(51) Int. Cl.
*G06F 21/00* (2006.01)

(52) U.S. Cl. .............................. 726/27; 726/22; 726/23; 726/24; 726/25; 726/26

(58) Field of Classification Search .............. 726/22–27
See application file for complete search history.

(56) References Cited

U.S. PATENT DOCUMENTS

| | | | |
|---|---|---|---|
| 5,987,524 A | 11/1999 | Yoshida et al. | |
| 6,073,242 A | 6/2000 | Hardy et al. | |
| 6,393,484 B1 | 5/2002 | Massarani | |
| 6,490,493 B1 | 12/2002 | Dharnipragada | |
| 6,490,679 B1 | 12/2002 | Tumblin et al. | |
| 6,499,110 B1 | 12/2002 | Moses et al. | |
| 7,020,573 B2 | 3/2006 | Wheeler et al. | |
| 7,185,359 B2 | 2/2007 | Schmidt et al. | |
| 7,240,368 B1 * | 7/2007 | Roesch et al. ................. | 726/23 |
| 7,308,712 B2 * | 12/2007 | Banzhof ...................... | 726/22 |
| 7,337,224 B1 | 2/2008 | Van Horne, III et al. | |
| 7,360,237 B2 | 4/2008 | Engle et al. | |
| 7,424,384 B2 | 9/2008 | Wheeler et al. | |
| 7,472,422 B1 * | 12/2008 | Agbabian ..................... | 726/25 |
| 7,509,676 B2 * | 3/2009 | Trueba ........................ | 726/22 |
| 2002/0025031 A1 | 2/2002 | Maeda et al. | |
| 2002/0042832 A1 * | 4/2002 | Fallentine et al. ........... | 709/230 |
| 2002/0162017 A1 * | 10/2002 | Sorkin et al. ................ | 713/201 |
| 2003/0154394 A1 * | 8/2003 | Levin .......................... | 713/200 |
| 2004/0139227 A1 * | 7/2004 | Takeda ........................ | 709/245 |

(Continued)

OTHER PUBLICATIONS

"BigFix® Announces Support for Network Access Protection Technology from Microsoft," BigFix, Inc., Jul. 13, 2004, [online] [Retrieved on Mar. 31, 2006] Retrieved from the Internet<URL:http://www.bigfix.com/press/news/pr_071304.html>.

(Continued)

Primary Examiner—Carl Colin
(74) Attorney, Agent, or Firm—Fenwick & West LLP (57) ABSTRACT

Techniques for implementing client compliancy in a network address translation (NAT) environment are disclosed. Network appliances (e.g., NAT hubs, routers, switches, and other NAT devices) actively cooperate with client compliance strategies by engaging in the compliance evaluation of the hosts connected to it, and interact with the up-stream compliance mechanism. As such, devices normally hidden behind a NAT device from the upstream network can participate in the compliance scheme in a more meaningful way.

20 Claims, 6 Drawing Sheets

U.S. PATENT DOCUMENTS

| | | | |
|---|---|---|---|
| 2005/0005129 A1* | 1/2005 | Oliphant | 713/182 |
| 2005/0216957 A1* | 9/2005 | Banzhof et al. | 726/25 |
| 2005/0229256 A2* | 10/2005 | Banzhof | 726/25 |
| 2005/0262086 A1* | 11/2005 | Ta et al. | 707/9 |
| 2005/0278775 A1 | 12/2005 | Ross | |
| 2006/0101520 A1* | 5/2006 | Schumaker et al. | 726/25 |
| 2006/0230437 A1 | 10/2006 | Alexander Boyer et al. | |
| 2006/0259960 A1 | 11/2006 | Kondo | |

OTHER PUBLICATIONS

BigFix Client Compliance: Cisco NAC, BigFix, Inc., Apr. 25, 2005, [online] [Retrieved on Mar. 31, 2006] Retrieved from the Internet<URL:http://www.satisnet.co.uk/downloads/bigfix/bigfix_cisco_nac.pdf>.

"BigFix® Closes the "Scan & Block" Remediation Gap with Expanded Endpoint Security Offerings," BigFix, Inc., Oct. 7, 2004, [online] [Retrieved on Mar. 31, 2006] Retrieved from the Internet<URL:http://www.bigfix.com/press/news/pr_100704.html>.

Walder, Bob, "Intrusion Detection Systems," TechOnLine, 1996-2006, [online] [Retrieved on Mar. 31, 2006] Retrieved from the InternetURL:http://www.techonline.com/community/ed_resource/feature_article/20645>.

Langston, R., "Network Access Control Technologies and Sygate Compliance on Contact," Sygate Technologies, Inc., 2005, [online] [Retrieved on Jul. 31, 2006] Retrieved from the Internet<URL:http://www.softwarespectrum.com/symantec/docs/WP-Sygate-Network-Access-Control.pdf>.

United States Office Action, U.S. Appl. No. 11/271,656, Dec. 2, 2009, 17 pages.

United States Office Action, U.S. Appl. No. 11/325,762, Dec. 24, 2009, 16 pages.

* cited by examiner

CLIENT COMPLIANCY IN A NAT ENVIRONMENT

RELATED APPLICATIONS

This application is a continuation-in-part of U.S. application Ser. No. 10/305,622, filed Nov. 27, 2002, now U.S. Pat. No. 7,249,187, titled "Enforcement of Compliance with Network Security Policies." This application is also related to U.S. application Ser. No. 11/271,656, filed Nov. 9, 2005, titled "Enhanced Client Compliancy Using Database of Security Sensor Data". Each of these applications is herein incorporated in its entirety by reference.

FIELD OF THE INVENTION

The invention relates to client compliancy, and more particularly, to client compliancy in a NAT system through compliancy aware network appliances.

BACKGROUND OF THE INVENTION

A client compliancy system is used to gate access to a protected network, such that only clients that are in compliance with a policy are allowed access to the protected network. Clients that are not in compliance are typically assigned to a quarantine network and provided with some remediation mechanism that should allow them to become compliant. Determination of a client's compliance can be done on the client itself, external to the client, or in combination.

In a NAT (network address translation) environment, however, what appears to such a compliance system as a single host (by virtue of its single IP/MAC address) is actually a collection of hosts. An example of such a NAT environment is an office network where some offices have multiple machines attached to a hub, switch, and/or security appliance such as a Firewall/VPN appliance. In such a case, only the IP/MAC address of the hub, switch, or security appliance can be seen by the client compliancy system.

This presents a problem for a client compliancy system that attempts to assign compliant network nodes to a protected network and non-compliant nodes to a remediation network. In particular, the up-stream standard compliance mechanism cannot directly evaluate the hosts behind the visible NAT node, and therefore cannot assign them to the appropriate network.

What is needed, therefore, are techniques for implementing client compliancy in a NAT environment.

SUMMARY OF THE INVENTION

One embodiment of the present invention provides a method for enforcing client compliance in a NAT environment on a network. The method includes storing non-compliance data in a NAT device, the non-compliance data including identifiers of non-compliant devices on the network. The method continues with receiving a query at the NAT device as to a target device's compliance status, the query including an identifier of the target device. The method continues with determining compliance status of the target device, based on the non-compliance data and the identifier of the target device. The identifiers of non-compliant devices can be, for example, network addresses including at least one of MAC and IP addresses. In response to determining that the target device is compliant, the method may include assigning the target device to a protected network coupled to the NAT device. In response to determining that the target device is non-compliant, the method may include assigning the target device to a quarantined network coupled to the NAT device, and taking remedial steps to eliminate non-compliance. The NAT device may have VLAN capability for segregating compliant and non-compliant devices. Non-compliance data can be received, for example, at least one of periodically according to a predetermined schedule and on a real-time basis as non-compliances are detected. Determining compliance status of the target device may include, for instance, comparing the identifier included in the query against identifiers in a database included in the NAT device. In one particular embodiment, the query is sent by the target device itself as part of a self-policing compliance scheme. In one such case, the self-policing compliance scheme further includes removing the identifier of the target device from a NAT device database under the assumption that the target device has put itself in abeyance with security policies of the network. Here, and in response to non-compliance of the target device subsequently being detected, the method may further include re-admitting the target device's identifier to the NAT device database. In other configurations, removal of a network device listing in a NAT device database can be tied to that device's placement into remediation.

Another embodiment of the present invention provides a machine-readable medium (e.g., compact disk, diskette, server, or hard drive) encoded with instructions, that when executed by a processor, cause the processor to carry out a process for enforcing client compliance in a NAT environment on a network. This process can be, for example, similar to or a variation of the previously described method.

Another embodiment of the present invention provides a NAT device for enforcing client compliance in a NAT environment on a network. The apparatus includes a database for storing non-compliance data, the non-compliance data including identifiers of non-compliant devices on the network. The apparatus further includes a compliance verification component for receiving a query as to a target device's compliance status, and for determining compliance status of the target device, based on the non-compliance data stored in the database and an identifier of the target device. The identifier of the target device can be included, for example, in the query. The NAT device can be further configured with VLAN capability for segregating compliant and non-compliant devices. Determining compliance status of the target device by the compliance verification component may include, for instance, comparing the identifier included in the query against identifiers in the database. In one particular configuration, removal by the compliance verification component of a network device listing from the database is tied to that device's placement into remediation. The database and compliance verification component of the NAT device can be implemented, for example, in software (e.g., executable instructions encoded on a computer-readable medium), hardware (e.g., gate. level logic), or other suitable means.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Techniques for implementing client compliancy in NAT environments are disclosed. Network appliances actively cooperate with client compliance strategies by engaging in the compliance evaluation of the hosts connected to it, and interact with the up-stream compliance mechanism.

General Overview

As previously described, many popular network appliances create NAT environments that appear as one node when in reality multiple computers lie behind the NAT device. A client compliancy system in a NAT environment should be able to assign compliant nodes to a protected network and non-compliant nodes to a remediation network.

One embodiment of the present invention implements a client compliance determination scheme within the "inside" network behind the NAT device, as well as support by the NAT device for interacting with the client compliance scheme in the "outside" network upstream from the NAT device. The client compliance determination scheme also implements the ability, depending on the security policies, to quarantine the inside network behind the NAT device if any one of its constituents are out of compliance, and/or for the NAT device to manage access for the non-compliant members of its inside network. Such access management can be used, for example, in cases where the NAT device has both internal and external VLAN control capabilities, as will be apparent in light of this disclosure.

Consider a DHCP proxy based compliance scheme such as that described in the previously incorporated U.S. application Ser. No. 10/305,622, titled "Enforcement of Compliance with Network Security Policies." In one such system, a compliance database is maintained by agents running on each client machine. The agents consult a policy source, compare the state of the target client with the policy, and update the compliance database by reporting the determined policy compliance of the target client. When requesting an address via DHCP, the DHCP proxy used in the scheme queries the compliance database for the MAC and/or IP address that is requesting an address. In one particular case, if the compliance database has an entry for that MAC/IP address which indicates compliance, then the requesting client is assigned an address on the protected network. If the compliance database has no entry for the requesting MAC/IP address (or the compliance database otherwise indicates non-compliance of the requesting device), then the client is assigned to a restricted/quarantined network (or is given no address at all).

A compliance aware NAT device can participate in this scheme, for example, by having the NAT device maintain its own compliance database and policy store for the clients within its inside network (behind the NAT device). Agents running on clients behind the NAT device can update the compliance database of the NAT device just as agents running on clients in the upstream compliancy system update that system's compliance database (on the outside network in front of the NAT device). The NAT device itself can also act as a client agent and update the upstream compliance database with the MAC/IP address of the NAT device indicating a status of compliance with policy if all of its clients (behind the NAT device) are in compliance with policy. The policy retrieved by the NAT device when acting as a client agent to the upstream compliancy system can be made available to the clients on the inside network belonging to the NAT device in the same way as it is made available in the upstream system (e.g., via a policy store maintained and provided to the inside network by the NAT device). When a new client on the inside network of the NAT device requests an address and either doesn't have an entry in the NAT device's version of the compliance database, or has an entry indicating non-compliance, then the NAT device itself can report its own MAC/IP address as non-compliant to the upstream compliance database and release/renew its DHCP address so that it can be properly remedied by the upstream client compliancy system (e.g., put on to the quarantine network). Thus, in this particular example, the NAT device would only be on the protected network if all of its clients met the policy of the upstream compliancy system; otherwise, the NAT device (and all of its clients) would be on the restricted/quarantine network.

There are other client compliance schemes, such as 802.1X proxies, that can be used as well. The techniques described herein can be adapted in similar fashion for use with such other client compliance schemes. In addition, a NAT device configured with VLAN control capabilities can be used to manage an inside network having both protected and restricted networks. In such a case, the VLAN-enabled NAT device can assign compliant clients a NAT address on a compliant or otherwise protected VLAN, and noncompliant clients a NAT address on a remediation or otherwise restricted network.

Example System Architecture

Figure 1:
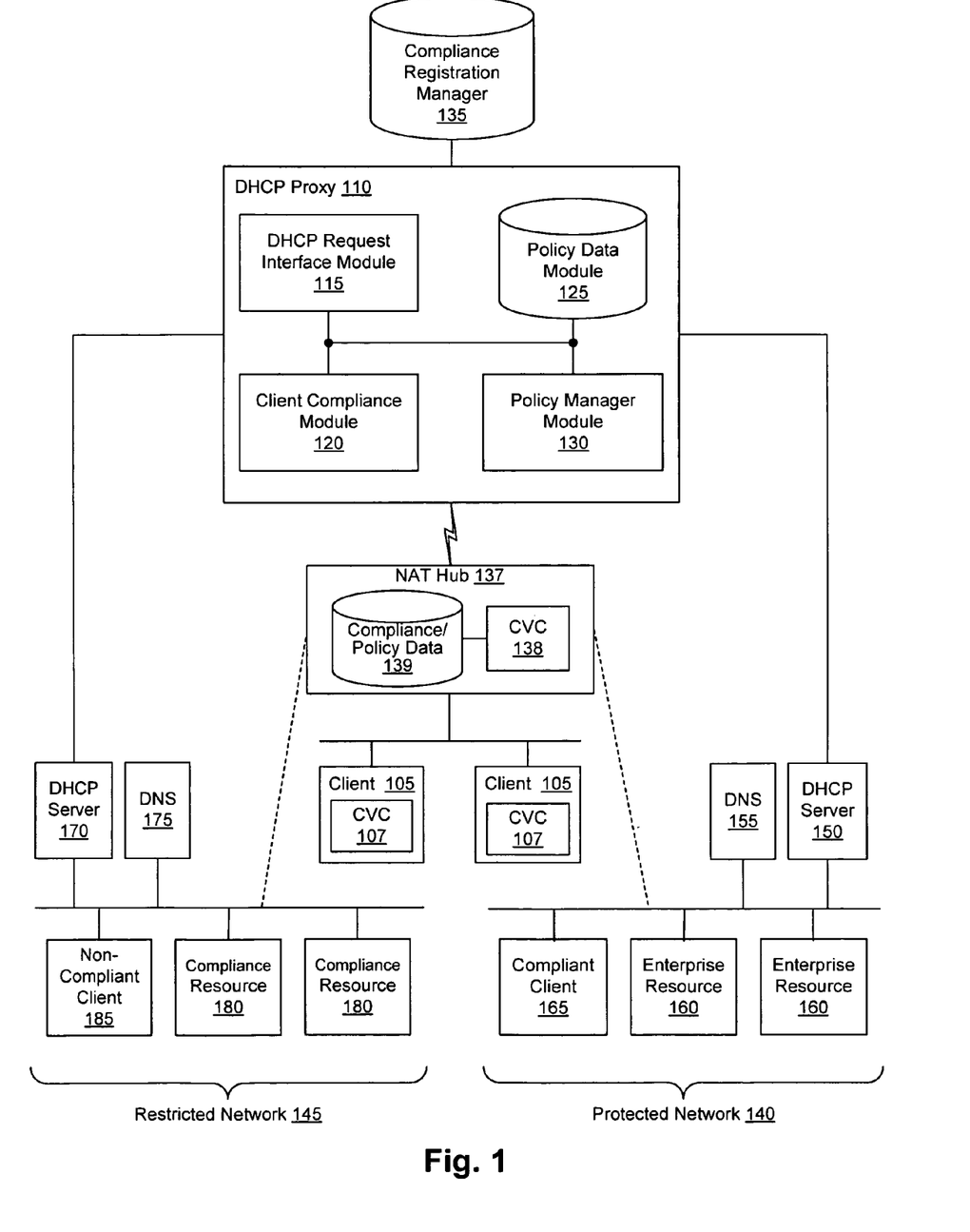
FIG. 1 shows a system configured for enforcing a set of computer network security policies in a NAT environment, in accordance with one embodiment of the present invention.

FIG. 1 shows a system configured for enforcing a set of computer network security policies in a NAT environment, in accordance with one embodiment of the present invention.

As can be seen, the system includes a DHCP proxy 110, a compliance registration manager 135, a NAT hub 137 with two clients 105 on its inside network, and a protected network 140. In addition, the system optionally includes one or more restricted networks 145. In practice, for example, the protected network 140 is a corporate network that allows users to communicate and share information inside the protection of a corporate firewall. Typically, an administrator for the corporate network will outline a set of security policies with which users of the network must comply, e.g., by properly configuring their client 105 machines. Accordingly, given a set of security policies associated with the protected network 140, the system allows the network administrator to enforce compliance with the security policies by each client 105 that accesses the protected network 140. In one particular embodiment, the system enforces these security policies by assigning a client 105 to the protected network 140 or a restricted network 145 based on whether the client 105 is in compliance with the security policies.

In the embodiment shown, the NAT hub 137 is requesting access to the protected network 140, and is treated by the compliance system just as an individual client 105 is treated. However, the compliance status of the NAT hub 137 in this particular configuration depends on the compliance status of each of the two clients 105 to which it is coupled. In such a case, the NAT hub 137 serves two general functions. First, it effectively acts as a client that can be directly managed by the upstream compliance system (e.g., DHCP proxy 110 and compliance registration manager 135). Second, the NAT hub 137 effectively acts as the compliance system for its clients 105 and can report their compliance status upstream, as they cannot be directly managed by the upstream compliance system.

To this end, the NAT hub 137 includes a compliance verification component (CVC) 138 and a compliance policy database 139. The compliance verification component 138, which in one embodiment is implemented as a computer program that runs on the NAT hub 137, uses applicable security policies to determine whether its clients 105 are in compliance with those policies. The security policies can be queried by the compliance verification component 138 from a central store (e.g., database 125 of the DHCP proxy 110), and then stored in database 139. Such a query can be performed in one example using the Lightweight Directory Access Protocol (LDAP), which is used to access directory listings and is supported by directory products such as Directory Server by Sun Microsystems and Active Directory by Microsoft. Alternatively, the compliance verification component 138 can be adapted to obtain the security policies in real-time (e.g., from policy data module 125), without storing the policies on the NAT hub 137. Alternatively, the NAT hub 137 may be provided with a static set of security policies that need not be updated.

In addition to storing security policies from the upstream compliance system, the NAT hub 137 is also capable of storing the compliance data for its clients 105, in database 139. The compliance data for each client 105 indicates the identity of the client 105 and whether the client 105 is in compliance with the security policies. In one embodiment, each client is identified by a MAC and/or IP address (or other suitable identifier) associated with the client. In addition to storing this compliance data, the NAT device 137 accepts queries for a client's compliance (e.g., based on the client's MAC/IP address), and returns the compliance status to the requesting client 105, by way of compliance verification component 138. The NAT device 137 also accepts commands for updating compliance data entries and creating new ones, by way of compliance verification component 138. Note that in other embodiments, the compliance verification component 138 and database 139 can be programmed or otherwise integrated into a single module within the NAT hub 137. Numerous configurations will be apparent in light of this disclosure.

In any case, the NAT hub 137 knows the compliance status of its clients 105, and can report that status to the upstream compliance system. If any one client 105 is non-compliant, then NAT hub 137 (and its clients 105) can be assigned to the restricted network 145 by the upstream compliance system. Otherwise, if all clients 105 of the NAT hub 137 are compliant, then NAT hub 137 (and its clients 105) can be assigned to the protected network 140 by the upstream compliance system. In an alternative embodiment, as will be discussed with reference to FIG. 5, a NAT hub configured with VLAN capability could segregate its clients 105 to corresponding protected or restricted inside VLAN networks.

A client (including clients 105, non-compliant clients 185, and compliant clients 165) can be any type of computer, such as a computer system (e.g., desktop/lap), personal data assistant (PDA), portable phone, smart phone, and/or any other digital device capable of communicating with devices over a network. Two clients 105 are shown coupled to the inside network or NAT hub 137, but any number of clients 105 may be present (including zero clients 105). Same goes for the number of non-compliant clients 185 and compliant clients 165.

The network, including the protected and restricted networks 140,145, can be implemented with any type or combination of computer networking technology and protocols that allow for communications between the various network devices. Both wired and wireless technologies can be used, or some combination thereof, as will be apparent in light of this disclosure.

The protected network 140 includes a compliant client 165, a DHCP server 150, a domain name server (DNS) 155, and a set of enterprise resources 160. In one such embodiment, the enterprise resources 160 include resources such as a corporate intranet, licensed software, shared storage, and an email server. The restricted network 145 includes a non-compliant client 185, a DHCP server 170 and a DNS 175. As can be seen, the non-compliant client 185 (and any other non-compliant device coupled to this network 145, such as a NAT device with one or more non-compliant clients) does not have access to the full set of enterprise resources 160. Rather, the restricted network 145 provides access only to a set of compliance resources 180. These compliance resources 180 include some or all of the resources that a non-compliant client 185 needs to become in compliance with the security policies. Thus, if NAT hub 137 (and its clients 105) is assigned to the restricted network 145, then its clients could use compliance resources 180 to become compliant. Such resources 180 include, for example, anti-virus software and virus definitions, personal firewall software, client software, software updates and patches, and network configuration settings.

Variations on this implementation will be apparent in light of this disclosure. For example, although separate DHCP servers 150,170 and DNSs 155,175 are shown for the protected and restricted networks 140,145, respectively, these components may actually be implemented in the same systems. In addition, note that the NAT hub 137 can be any type of NAT device (e.g., router, switches, and access points), used to couple one or more clients 105 or other devices on one or more inside networks to an outside network. Such devices are generally configured with conventional or custom NAT functionality for carrying out network address translation, in addition to compliance functionality described herein.

The DHCP proxy 110 is used to segregate compliant clients 165 from non-compliant clients 185 so that the protected network 140 is protected from the risks of security policy violations. The DHCP proxy 110 operates by assigning network access to a client 105 and/or a NAT device 137 (and its clients 105) based on compliance with the security policies by the involved clients. The DHCP proxy 110 comprises a DHCP request interface module 115, a client compliance module 120, a policy data module 125, and a policy manager module 130, each module communicatively coupled to one another. As used herein, a module may be implemented in hardware, software, firmware, or any combination thereof. In addition, any of the modules or a portion thereof may be stored and/or executed by a remote device coupled to any part of the system. The DHCP proxy 110 may be implemented in a network appliance (such as a router, a switch, or a network firewall device), in a DHCP server itself, or in a software program coupled to the networks 140,145.

The security policies are definable by the network administrator. In one embodiment, the security policies are rules-based, which allows them to be created and modified easily. These policies may include rules related to proper configuration of software on the involved clients (including enabling of particular features and specifying values for settings thereon), installation on the involved clients of security software or other software programs (including anti-virus software and personal firewall software), updates for the security software or other software programs (including versions of the software and operating system security patches), and virus definitions. Additionally, the security policies can be configured to enforce software license agreements, where the security policies include rules related to installation on the client of licensed software and available site licenses for the licensed software. Definitions for the security policies can be stored electronically for access by any system component that requires them. In one embodiment, the security policies are stored in the policy data module 125 of the DHCP proxy 110. The policy manager module 130 is responsible for updating the security policies in the policy data module 125 and transmitting the updated policies to the clients 105, as well as to the NAT hub 137. The security policies may also be stored on each client 105 if so desired, and/or in the policy database 139 of the NAT hub 137, as previously explained.

The DHCP request interface module 115 is configured to receive a DHCP request for an IP address from the NAT device 137 (or from some other client). The client compliance module 120 is configured to retrieve, responsive to the DHCP request, compliance data from the compliance registration manager 135, the compliance data indicating whether the NAT device 137 (and particularly, its clients 105) is in compliance with the set of security policies. Responsive to the retrieved compliance data indicating that the NAT device 137 (and its clients) is in compliance with the set of security policies, the DHCP request interface module 115 assigns the NAT device 137 a logical address on the protected network 140. In this case, the DHCP request interface module 115 obtains the logical address on the protected network 140 from the DHCP server 150 for the protected network. In one embodiment, and as previously explained, the client compliance module 115 retrieves compliance data for a particular client or NAT device by querying the compliance registration manager using a MAC address associated with the client or NAT device. In response to the retrieved compliance data indicating that the NAT device 137 is not in compliance (based on non-compliance of one or more of its clients 105) with the set of security policies, the DHCP request interface module 115 can perform a number of actions, as will be apparent in light of this disclosure. For instance, the DHCP request interface module 115 can deny the NAT device's 137 DHCP request for an IP address, and/or assign the NAT device 137 a logical address on the restricted network 145. In this case, the DHCP request interface module 115 obtains the logical address on the restricted network 145 from the DHCP server 170 for the restricted network 145.

The compliance registration manager 135 is capable of storing the compliance data for a number of clients. In addition, the compliance registration manager 135 treats the NAT hub 137 (or other NAT devices) as a client for purposes of this discussion. The compliance data for each client indicates the identity of the client and whether the client is in compliance with the security policies. In the case of the NAT hub 137, the compliance data indicates the identity of the NAT hub 137 and whether its clients 105 are in compliance with the security policies. In one embodiment, each client or NAT device is identified by a MAC and/or IP address (or other suitable identifier) associated with the client or NAT device. In addition to storing this compliance data, the compliance registration manager 135 accepts queries for a client's or NAT device's compliance (e.g., based on the client's or NAT device's MAC/IP address), and returns the compliance status for the client or NAT device, by way of client compliance module 120. The compliance registration manager 135 also accepts commands for updating compliance data entries and creating new ones, by way of client compliance module 120. Note that in other embodiments, the client compliance module 120 and compliance registration manager 135 can be programmed or otherwise integrated into a single module. Numerous configurations will be apparent in light of this disclosure. Note the similarity in this upstream compliance system functionality to the functionality of the NAT hub 127 provided to its clients 105.

In one particular embodiment, a list of IP/MAC addresses combined from intrusion detection system (IDS) and vulnerability assessment (VA) sensors (and/or any other security sensing technologies) is made available by the compliance registration manager 135 as a non-compliance database. Thus, the presence of a client's MAC and/or IP address in the non-compliance database (e.g., as reported in response to a query) is indicative of that device's non-compliant status. Other mechanisms can be used to collect the identity and compliance status of elements on the network.

As will be apparent in light of this disclosure, functionality of the upstream compliance system (e.g., DCHP proxy 110 and compliance registration manager 135) can also be integrated into the NAT hub 137 (or other NAT device). Thus, not only can devices on the outside network (e.g., compliant client 165, non-compliant client 185, and NAT hub 137) communicate with the compliance registration manager 135 to effect a compliance policy, but also devices on the inside network (e.g., clients 105) can communicate with the NAT hub 137 to effect that same compliance policy (or some variation thereof).

To that end, the system also includes a compliance verification component 107, which in this embodiment is implemented as a computer program that runs on each of the clients 105 (and may also exist on other clients, such as compliant client 165 and non-compliant client 185). The compliance verification component 107 uses the security policies to determine whether the client 105 is in compliance with the policies. In one such embodiment, the security policies are provided to the clients 105 by the NAT hub 137 (from database 139) in a similar manner in which security policies are provided from the DHCP proxy 110 (from database 125) to the NAT hub 137. The compliance verification component 107 can also query the NAT hub 137 for the client's 105 compliance (e.g., based on the client's MAC/IP address), and receive the compliance status (e.g., from the compliance verification component 138 of the NAT hub 137). The compliance verification component 107 can also issue commands to update compliance data entries and create new ones in the database 139, by way of compliance verification component 138.

Methodology

Figure 2A:
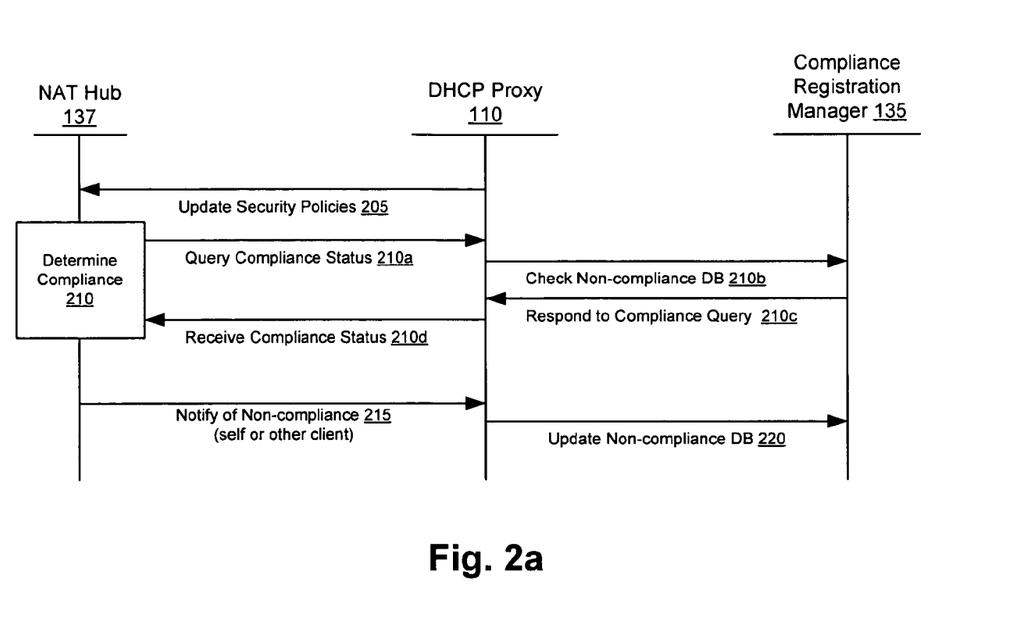
FIG. 2a is a timing diagram of a process for updating a NAT device's compliance data according to one embodiment of the present invention.

FIG. 2a is a timing diagram of a process for updating a NAT device's compliance data according to one embodiment of the present invention. Optionally, before the compliance data for a NAT hub 137 is determined, the compliance verification component 138 updates 205 to a current version of the security policies. Thereafter, the compliance verification component 138 determines 210 whether the NAT hub 137 is in compliance with the security policies. This step 210 may be performed at any time a network administrator determines appropriate. For example, the compliance verification component 138 can be programmed other otherwise configured to determine 210 compliance in response to a request from the DHCP proxy 110 for the NAT hub's 137 compliance data. Alternatively, step 210 can be performed at predetermined time intervals, upon startup of the NAT hub 137 or upon connection of NAT hub 137 to the network, upon DHCP requests, in response to various events (e.g., every load of system software), or a combination thereof (e.g., after a day if no reload occurred within a day).

In the embodiment shown, step 210 is carried out by the verification component 138, as follows. A query 210a for compliance status is issued by the verification component 138 of NAT hub 137. The query includes the MAC and/or IP address (or other identifier) of the target device. Note that this query can be, for example, a self-query (where NAT hub 137 is checking its own compliance status), or a query relevant to a client 105 on its inside network. Thus, the subject of the query is generally referred to as the target device. The DHCP proxy 110 processes the query and checks 210b the non-compliant database (of the compliance registration manager 135). In this particular embodiment, the check includes comparing the MAC and/or IP address of the target device to the list of MAC and/or IP addresses stored in the non-compliant database. If a match is found, then the target device is non-compliant. Otherwise, the target device has a status of compliant. In any case, the compliance registration manager 135 responds 210c with the compliance status of the target device. The DHCP proxy 110 processes the response and the verification component 138 of NAT hub 137 receives 210d the requested compliance status data.

The compliance verification component 138 can also independently determine 210 whether the target device is in compliance, and then notify 215 the DHCP proxy 110 by transmitting the compliance data. As explained above, the compliance data identifies the target device (e.g., based on MAC/IP address) and whether it is in compliance (e.g., compliance bit set to logical one if compliant, and logical zero if non-compliant). In one embodiment, the target device is associated with one or more MAC addresses. For example, the client may be a computer system having a network card installed, where the network card has a MAC address. The MAC address operates as a globally unique serial number, so it is well suited for identifying a target device. The DHCP proxy 110 then proceeds with updating 220 the non-compliance database for the target device with the compliance registration manager 135.

Figure 2B:
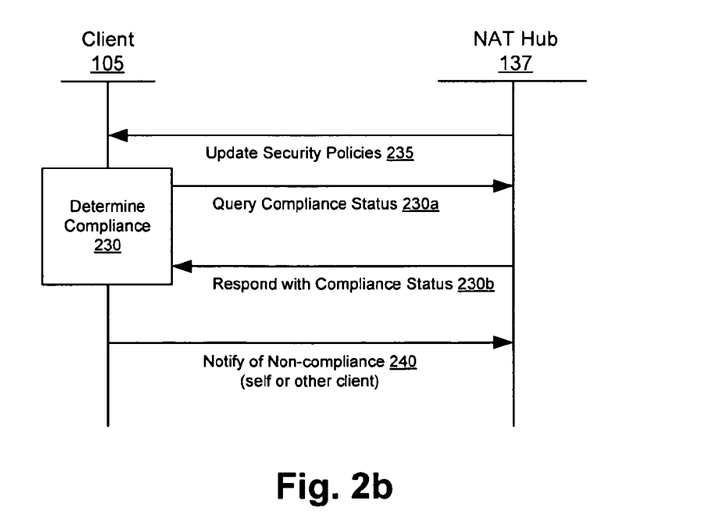
FIG. 2b is a timing diagram of a process for updating compliance data of a client on the inside network of a NAT device according to one embodiment of the present invention.

FIG. 2b is a timing diagram of a process for updating compliance data of a client on the inside network of a NAT device according to one embodiment of the present invention. Optionally, before the compliance data for a client 105 is determined, the compliance verification component 107 updates 235 to a current version of the security policies. Thereafter, the compliance verification component 107 determines 230 whether the client is in compliance with the security policies. This step 230 may be performed at any time, just as step 210 of FIG. 2a.

In the embodiment shown, step 230 is carried out by the verification component 107, as follows. A query 230a for compliance status is issued by the verification component 107 of client 105. The query includes the MAC and/or IP address (or other identifier) of the target device. Note that this query can be a self-query (where device 105 is checking its own compliance status), or a query relevant to another device on the network on the inside network of the NAT hub 137. The NAT hub 137 processes the query and checks its non-compliant database (database 139). In this particular embodiment, the check includes comparing the MAC and/or IP address of the target device to the list of MAC and/or IP addresses stored in the non-compliant database. If a match is found, then the target device is non-compliant. Otherwise, the device has a status of compliant. In any case, the NAT hub 137 responds 230b with the compliance status of the target device, and the verification component 107 of client 105 receives the requested compliance status data. Note that the compliance verification component 107 can also independently determine 230 whether the target client is in compliance, and then notify 240 the NAT hub 137 by transmitting the compliance data. As previously explained, the compliance data identifies the target client (e.g., based on MAC/IP address) and whether it is in compliance (e.g., compliance bit set to logical one if compliant, and logical zero if non-compliant). The NAT hub 137 can then update the non-compliance database for the target client 105 with the compliance database 139, by way of module 138.

Figure 3:
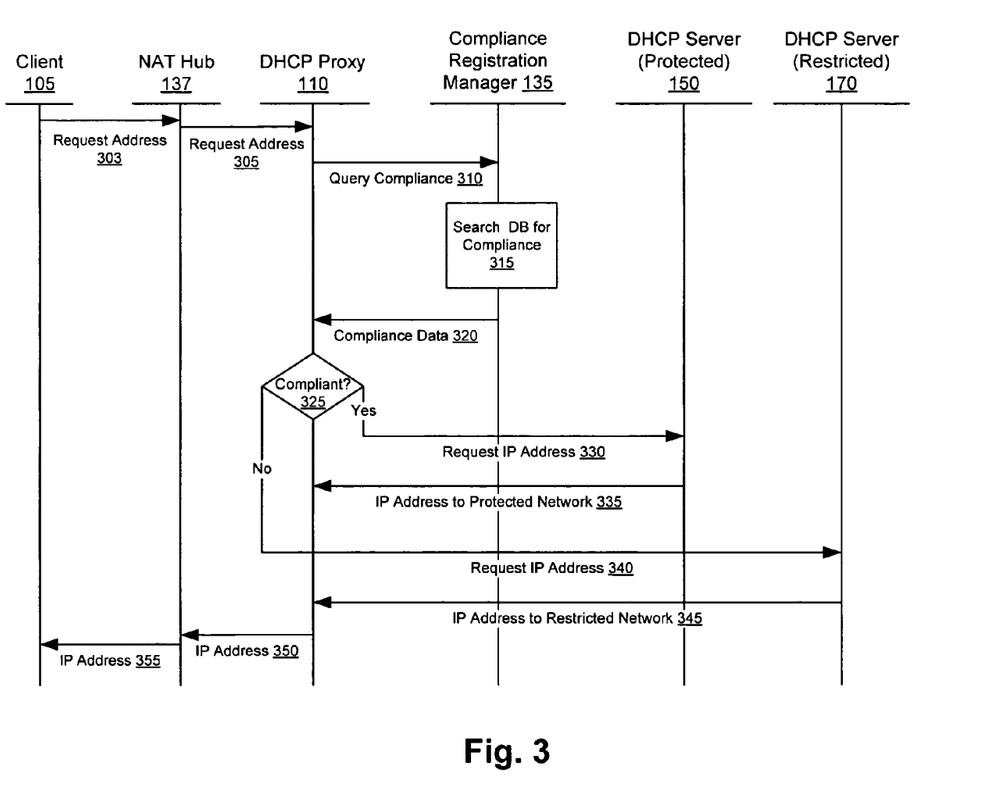
FIG. 3 is a timing diagram of a process for assigning a network address to a client and/or a NAT device according to one embodiment of the present invention.

FIG. 3 is a timing diagram of a process for assigning a network address to a client and/or a NAT device according to one embodiment of the present invention. As can be seen, this process is described in the context of requesting an IP address using the DHCP; however, the invention is not limited to this protocol. Rather, an embodiment of the invention is understood to enable the enforcement of network security policies by assigning network access based on a client's compliance with the policies, regardless of any particular implementation. The DHCP and use of one or more VLANs are just suitable tools for assigning network access to clients. Other authentication protocols/proxies, such as 802.1X can also be used.

In this particular embodiment, a client 105 that does not have a static IP address can access a network by requesting 303 an IP address from a NAT hub 137 to which it is connected. The NAT hub 137 is configured to intercept the request 303 from the client 105, and to determine if there is an entry in the NAT hub's 137 version of the compliance database (e.g., database 139) indicating the compliance status of the requesting device. If so, then the NAT hub 137 can respond 355 to the query. If the client 105 is compliant, then this response 355 can include an IP address for the requesting device, which may be on the inside network of the NAT hub 137, or on a protected VLAN of the NAT hub 137 (assuming VLAN capability). If the client 105 is not compliant, then the response 355 can include, for example, an IP address for the requesting device, on a restricted VLAN of the NAT hub 137 (assuming VLAN capability).

If NAT hub 137 has no compliance data on the requesting client 105, or the client is non-compliant, then the NAT hub 137 can report its own MAC/IP address as non-compliant to the upstream compliance database and release/renew its DHCP address so that it can be properly remedied by the upstream client compliancy system (e.g., put on to the quarantine network). Thus, in this particular example, the NAT hub 137 would only be on the protected network if all of its clients 105 met the policy of the upstream compliancy system; otherwise, the NAT hub 137 (and all of its clients) would be on the restricted/quarantine network. In more detail, the NAT hub 137 can release/renew as shown in FIG. 3.

The NAT hub 137 begins the process by requesting 305 an IP address from a DHCP server for the desired network. The DHCP proxy 110 is configured to intercept the DHCP request 305 from the NAT hub 137. Before providing the NAT hub 137 with an IP address, the DHCP proxy 110 first queries 310 the compliance registration manager 135 for the compliance data associated with the NAT hub 137. This query includes an identifier for the particular NAT hub 137. In one embodiment, this client-specific identifier is the NAT hub's 137 MAC address, which is normally included in a DCHP request packet and thus available to the DHCP proxy 110. Note that, for DHCP, using an IP address as a client-specific identifier is only valid for entities that already have an IP (first time IP address requesters have not previously had an IP address). Also, an IP address can change over time, so using a more permanent identifier like a MAC address may be necessary for consistent identification over time.

In response to the query 310, the compliance registration manager 135 searches 315 its database for an entry corresponding to the requesting NAT hub 137. If the entry is found, the compliance registration manager 135 returns 320 the compliance status that corresponds to the entry to the DHCP proxy 110. If an entry for the requesting NAT hub 137 is not found, the NAT hub 137 is treated as non-compliant. Accordingly, the compliance registration manager 135 returns 320 a non-compliant status associated with the requesting NAT hub 137. Alternatively, if an entry for the requesting NAT hub 137 is not found, the compliance registration manager 135 may request that the NAT hub 137 determine its compliance (e.g., according to the process of FIGS. 2a and 2b). In such a case, the compliance registration manager 135 waits until it receives the compliance data from the NAT hub 137 or until a timeout occurs before returning 320 the NAT hub's 137 compliance data to the DHCP proxy 110.

Upon determining 325 that the requesting NAT hub 137 is compliant with the security policies, the DHCP proxy 110 requests 330 an IP address from the DHCP server 150 on the protected network 140, which then returns 335 an IP address to the DHCP proxy 110 if one is available. Upon determining 325 the requesting NAT hub 137 is not compliant with the policies, or if the client 105 is compliant but no IP address on the protected network 140 is available, the DHCP proxy 110 requests 340 an IP address from the DHCP server 170 on the restricted network 145. This DHCP server 170 then returns 345 an IP address associated with the restricted network, if any are available. In the event that no IP addresses were available, the NAT hub 137 cannot access any network 140, 145, but the NAT hub 137 may repeat this requesting process at a later time or periodically until access is granted.

The DHCP proxy 110 then provides 350 the requesting NAT hub 137 with the obtained IP address. Using this address in accordance with the DHCP, the NAT hub 137 accesses either the protected network 140 or the restricted network 145, depending on the address obtained. Accordingly, the result of this process is that if the NAT hub 137 is compliant with the security policies (according to the latest compliance data in the compliance registration manager 135), the NAT hub 137 is assigned to the protected network 140 if an address for that network 140 is available. Otherwise, the NAT hub 137 is assigned to the restricted network 145, or the NAT hub's 137 DHCP request can be denied.

In some cases, the network administrators may not be able to implement a VLAN or otherwise enable logically separate networks. In other cases, there will simply only be one network (as opposed to protected and restricted networks). Accordingly, an embodiment of the invention includes a protected network 140 only. In such a case, a NAT hub 137 that is determined to not be in compliance with the security policies is not assigned any network address, and therefore that NAT hub 137 would have no network access. Alternatively, the DHCP proxy 110 (or other such mechanism) can be configured to provide very short-term address leases on the protected network 140 to non-compliant clients, such as a non-compliant NAT device. This short-term lease is useful, for example, for systems in which the creation of a restricted network 145 is not feasible, as it allows a NAT hub 137 to use the protected network 140 for a short time (and in a monitored or otherwise restricted fashion) to become compliant with the given security policies.

In another variation of the process shown in FIG. 3, a number of restricted networks 145 are provided. In one such embodiment, each NAT hub 137 (or other device) that is determined to be non-compliant is assigned to its own restricted network 145. Although this requires that the system to support a large number of logical networks, e.g., VLANs, it provides the added benefit of protecting non-compliant clients 185 and NAT hub's 137 from each other. For example, some NAT hub's 137 might be non-compliant for relatively minor infractions of the security policies, while other network devices might be much more susceptible to attacks by malicious code due to major infractions. Shielding non-compliant clients 185 and/or NAT devices from each other thus provides an added protection.

In another embodiment, a NAT hub 137 is automatically assigned to the restricted network 145 (e.g., upon startup) and thereafter may request access to the protected network 140 (which request is granted only if the NAT hub 137 is compliant with the security policies). This is implemented, for example, by configuring the DHCP proxy 110 to retrieve an address on the restricted network 145 responsive to the NAT hub's 137 first DHCP request. Accordingly, the NAT hub 137 is assigned to the restricted network 145 regardless of its compliance with the policies. The DHCP proxy 110 obtains the address on the restricted network 145 from that network's DCHP server 170. The DHCP proxy 110 provides the NAT hub 137 with that address, giving the NAT hub 137 access to the restricted network 145 only. Thereafter, the NAT hub 137 may request an IP address on the protected network 140 by making another DHCP request. This request is also intercepted by the DHCP proxy 110, which retrieves an address from the DHCP server 150 for the protected network 140 if the NAT hub 137 is determined to be in compliance with the security policies. Otherwise, the DHCP proxy 110 denies the request, and the NAT hub 137 continues to use the address on the restricted network 145 that was originally obtained.

Figure 4:
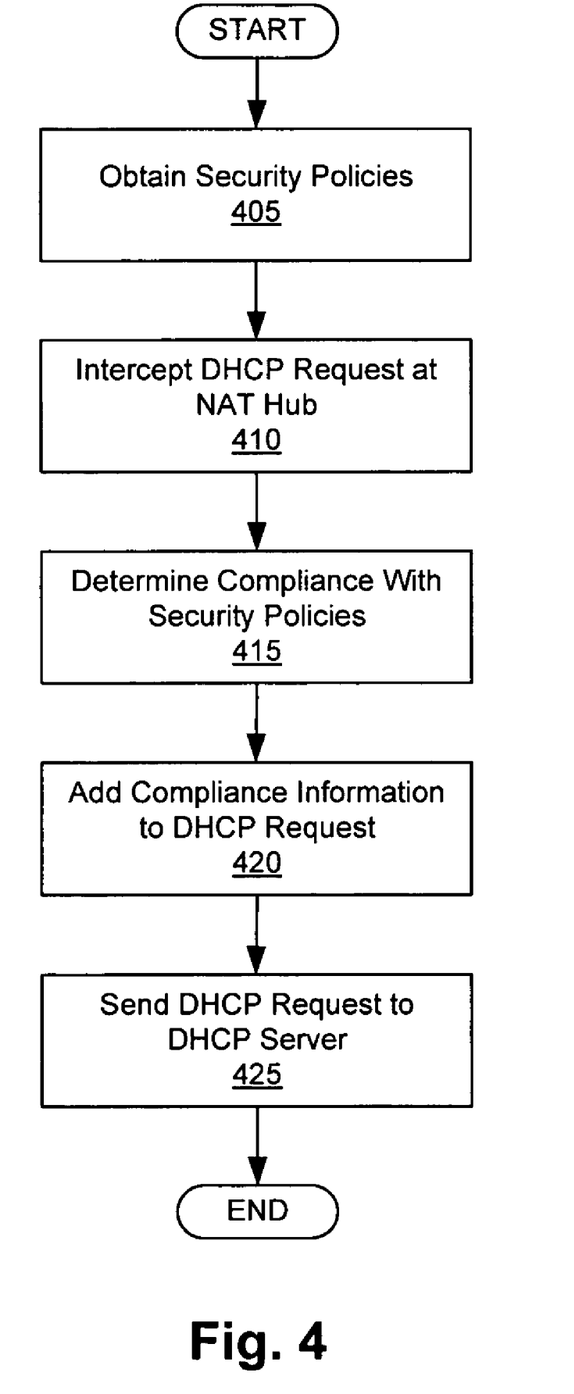
FIG. 4 illustrates a method for requesting a network address by a client in a NAT environment, in accordance with one embodiment of the present invention.

FIG. 4 illustrates a method for requesting a network address by a client in a NAT environment, in accordance with one embodiment of the present invention. The method can be carried out, for example, by a compliance verification component 138 that executes or runs on a NAT hub 137 (or other NAT device). In this embodiment, the compliance verification component 138 first obtains 405 the security policies, available for example from the policy data module 125 of the DHCP proxy 110. The component 138 can store these security policies and periodically update them (e.g., using database 139), or it can obtain 405 the policies real-time before performing this process.

When a client system 105 makes a DHCP request over its network connection, the NAT device 137 intercepts 410 this request. The NAT device 137 can intercept the DHCP request, for example, through its own DHCP server implementation or other suitable request intercept mechanism. Using the obtained security policies, the component 138 determines 415 whether the client 105 is in compliance with the policies. Alternatively, this determination may be performed periodically (e.g., before any DHCP request), and the compliance data are stored (e.g., on the client 105 and or the NAT device 137). Then, this step 415 can be performed quickly by merely checking the stored compliance data, rather than checking the security policies against the client 105 only after a DHCP request. This might be useful where the rule defining the security policies are extensive, as it helps to reduce the delay between a DHCP request and the client's obtaining an actual IP address. In any case, the determination can be carried out as discussed with reference to FIGS. 2a and 2b (by querying compliance database of the NAT device and/or the compliance database upstream).

If the NAT device 137 cannot assign the client 105 an IP address itself, then it can pass the request on to the DHCP proxy 110. In particular, using the obtained compliance data for the client 105, the component 138 of NAT device 137 adds 420 the compliance data to the DHCP request. Modifying the DHCP request can be performed, for example, by modifying the corresponding packet on the network stack. This modified DHCP request is then sent 425 to a DHCP server by way of the DHCP proxy 110. Alternatively, the component 138 can send a separate packet that contains the client's compliance data. The DHCP proxy 110 is configured to route the DHCP request to a DHCP server 150,170 on the protected or restricted network 140,145, depending on whether the client is in compliance with the security policies. Accordingly, the client 105 will be given an IP address on the protected network 140 (and thus access thereto) if the client 105 is in compliance; otherwise, the client 105 will only have access to a restricted network 145 or none at all.

VLAN-Enabled NAT Device

Figure 5:
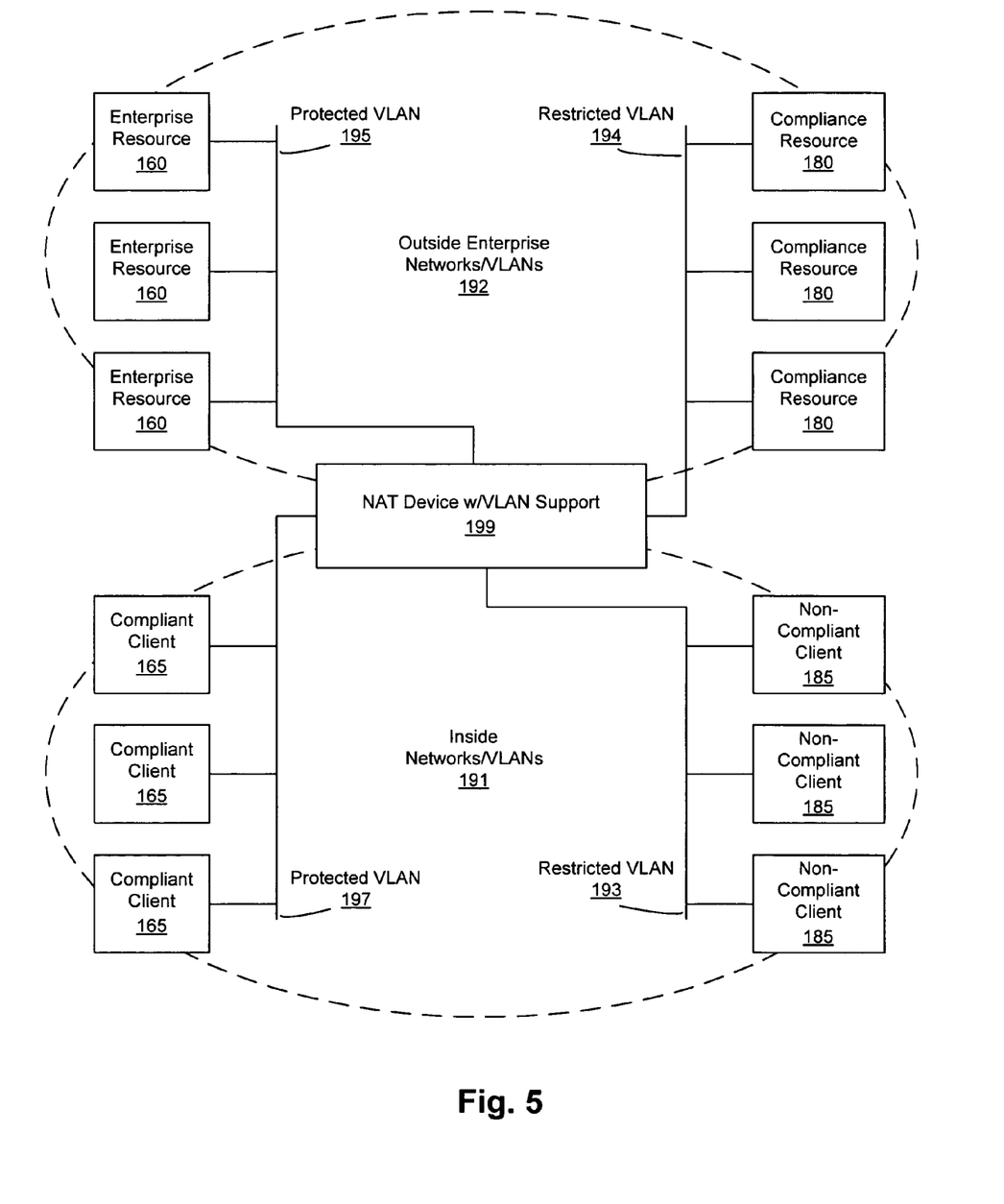
FIG. 5 shows a system configured for enforcing a set of computer network security policies in a NAT environment, in accordance with another embodiment of the present invention.

FIG. 5 shows a system configured for enforcing a set of computer network security policies in a NAT environment, in accordance with another embodiment of the present invention.

In this case, NAT device 199 has VLAN capability. As is known, a VLAN (virtual local area network) is a logical subgroup within a local area network that is created by software rather than physical connections. The use of VLANs allows network administrators to divide an enterprise's physical network resources into separate logical networks for segregating clients based on their compliance with the security policies. As previously explained, VLAN-enabled NAT devices can also segregate their complaint clients 105 from non-compliant clients 105.

As can be seen, the NAT device 199 has both compliant clients 165 and non-compliant clients 185 on its inside network. The compliant clients 165 are isolated on to a protected VLAN 197, and the non-compliant clients 185 are isolated on to a restricted VLAN 193. The VLAN capability of the NAT device 199 allows the NAT device 199 to selectively communicate with any client on its inside network and resources on the outside network, as well as to facilitate communication therebetween pursuant to security policies.

For example, the NAT device 199 allows the inside protected VLAN 197 to access the corresponding protected VLAN 195 on the outside enterprise network. Likewise, the NAT device 199 allows the inside restricted VLAN 193 to access the corresponding restricted VLAN 194 on the outside enterprise network. The compliance functionality of the NAT device 199 and clients, as well as the interaction with an upstream compliance system (e.g., DHCP proxy 110 and compliance registration manger 135) can be configured as discussed herein (e.g., with reference to FIGS. 1, 2a, 2b, 3 and 4).

For instance, just as the NAT hub 137 of FIG. 1, the NAT device 199 includes a client verification module, as well as a store of compliance data and security policies. The compliance data, as previously explained, includes a client identifier (e.g., MAC/IP address) and that client's compliance status. In addition, the upstream compliancy system (DHCP proxy 110) can couple to the protected VLAN 195 via a DHCP server (e.g., server 150 of FIG. 1). Likewise, the upstream compliancy system can couple to the restricted VLAN 194 via a DHCP server (e.g., server 170 of FIG. 1). Thus, communication between the NAT device 199 and the upstream compliance system is enabled as well. The NAT device 199 can access the upstream compliance system by, for example, a DHCP proxy 110.

Methodology

Figure 6:
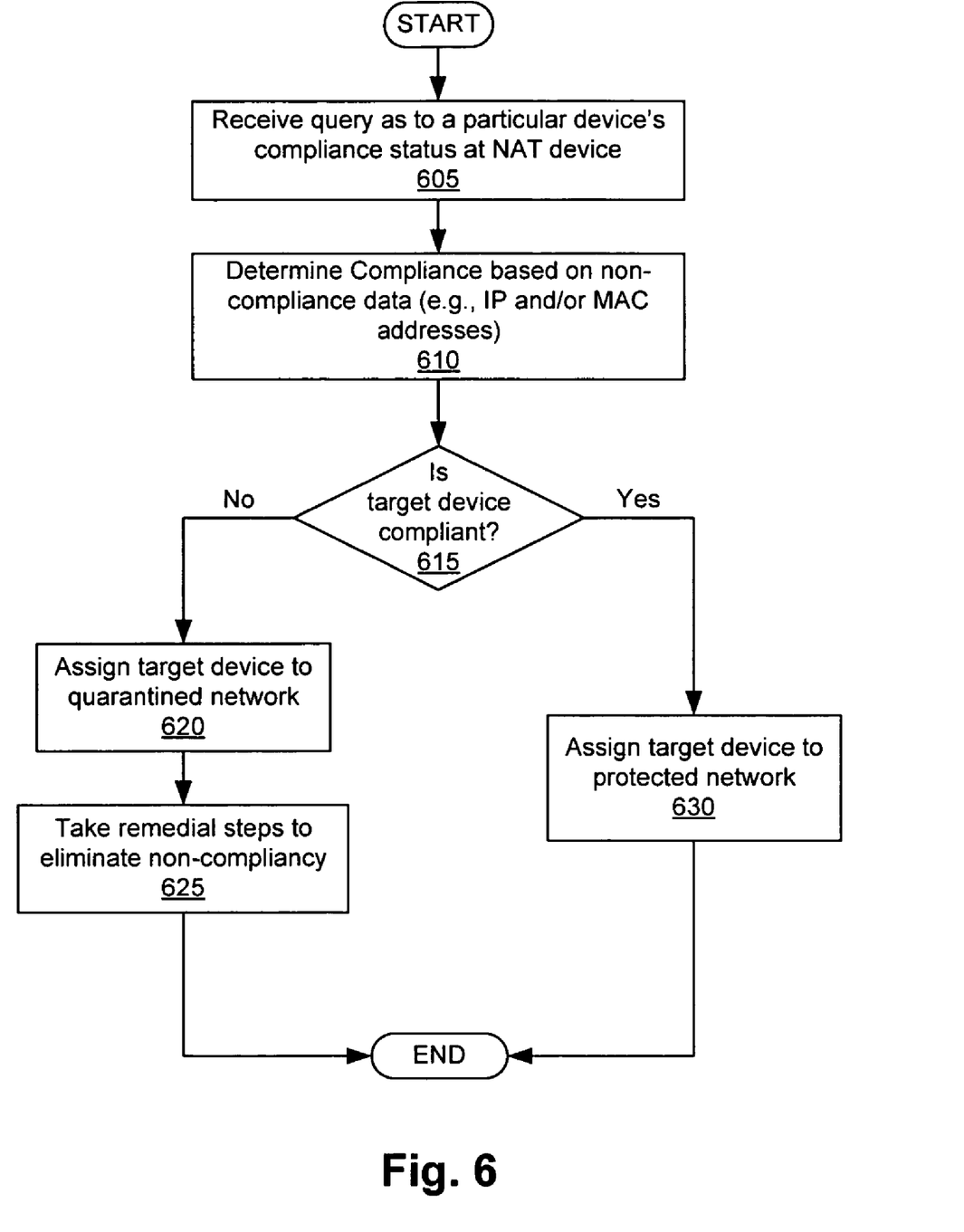
FIG. 6 illustrates a method for enforcing client compliance in a NAT environment, in accordance with one embodiment of the present invention.

FIG. 6 illustrates a method for enforcing client compliance in a NAT environment, in accordance with one embodiment of the present invention. The method can be carried out, for example, by a NAT device as discussed with reference to FIGS. 1 or 5.

In this particular embodiment, the method includes receiving 605 a query as to a particular device's compliance status. This query can be sent by the target device itself (e.g., self-policing client as previously discussed), or by some other network device (e.g., such as an 802.1X or DHCP proxy). In one embodiment, the query includes the MAC or IP address of the target device (or some other identifier).

The method continues with determining 610 compliance status of the target device, based on non-compliance data (e.g., compliance status indexed by IP and/or MAC addresses). In one embodiment, this determination includes comparing the IP or MAC addresses included in the query against IP/MAC addressed in a non-compliance database of the NAT device.

Based on the comparison, the method continues with determining 615 whether the target device compliant. For instance, if the address is present in the NAT device database, then the target device is non-compliant. If the address is not present in the NAT device database, then the target device is compliant. Recall that the act of querying can be carried out, for example, with a software agent running on the target client. In such a self-policing scenario, a query by a client for the client's own status can result, for example, in the removal of that client from the non-compliance database under the assumption that the client has put itself in abeyance. As previously explained, if the client has not entered a remediation state, then the external security sensors (e.g., intrusion detection, vulnerability assessment, or other security sensors) can be used detect indicia of non-compliance thereby resulting in the client's re-admission to the non-compliance database. Alternatively, the removal of the client from the non-compliance database can be tied with that device's placement into remediation. In client compliance systems that have an authentication step implemented as, for example, 802.1X or DHCP proxies, a query from the proxy does not result in removal of the IP/MAC address from the non-compliance database. In this way, the compliance system can distinguish self-query from proxy-based query by matching the IP being queried with the IP from which the query is issued.

In response to determining 615 that the target device is non-compliant, the method continues with assigning 620 the target device to a quarantined network, and taking 625 remedial steps to eliminate non-compliancy. Example remedial steps may include updating/installing anti-virus software and virus definitions, personal firewall software, software security patches, and network configuration settings. In response to determining 615 that the target device is compliant, the method continues with assigning 630 the target device to a protected network.

Note that the NAT device database (as well as upstream compliance databases) and its query can be implemented in a number of ways. For example, the database of non-compliant IP addresses could be made available via a special DNS response, as is done for RBL queries (RBL=realtime blackhole list, which contains the IP addresses of known spammers). Alternatively, the database may be implemented as a lookup table indexed by identifiers (e.g., MAP/IP addresses) that can be readily sorted and parsed for each query. Alternatively, the database may be implemented as a volatile memory indexed by identifiers (e.g., MAP/IP addresses) that can be readily sorted and parsed for each query. Any number of communication protocols (conventional or custom) can be used for submitting an IP address or MAC address to be checked against the database, and for responding with a status indication (compliant or non-compliant). This communication between a querying device and the non-compliance database can be sent directly between the device and the database, or by way of a proxy (e.g., DHCP or 802.1X), if applicable.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for enforcing client compliance in a network address translation (NAT) environment on a network, comprising:
    storing non-compliance data in a NAT device, the non-compliance data including identifiers of non-compliant devices within the NAT environment behind the NAT device;
    receiving a query at the NAT device as to a compliance status of a target device within the NAT environment, the query including an identifier of the target device;
    determining compliance status of the target device within the NAT environment based on the non-compliance data and the identifier of the target device; and
    responsive to determining a status of non-compliance for the target device within the NAT environment, reporting an identifier of the NAT device to an upstream client compliancy system indicating non-compliance of the NAT device.

2. The method of claim 1 further comprising:
    in response to determining that the target device is compliant, assigning the target device to a protected network coupled to the NAT device.

3. The method of claim 1 further comprising:
    in response to determining that the target device is non-compliant, assigning the target device to a quarantined network coupled to the NAT device; and
    taking remedial steps to eliminate non-compliancy.

4. The method of claim 1 wherein the NAT device has VLAN capability for segregating compliant and non-compliant devices.

5. The method of claim 1 wherein non-compliance data is received at least one of periodically according to a predetermined schedule and on a real-time basis as non-compliances are detected.

6. The method of claim 1 wherein determining compliance status of the target device includes comparing the identifier included in the query against identifiers in a database included in the NAT device.

7. The method of claim 1 wherein the query is sent by the target device itself as part of a self-policing compliance scheme.

8. The method of claim 7 wherein the self-policing compliance scheme further includes removing the identifier of the target device from a NAT device database responsive to a determination that the target device has put itself in compliance with security policies of the network.

9. The method of claim 8 wherein in response to non-compliance of the target device subsequently being detected, re-admitting the target device's identifier to the NAT device database.

10. The method of claim 1 wherein the identifiers of non-compliant devices are network addresses including at least one of MAC and IP addresses.

11. The method of claim 1 wherein the upstream client compliancy system stores non-compliance data including identifiers of non-compliant devices from among the NAT device and other client devices outside the NAT environment.

12. A machine-readable medium encoded with instructions, that when executed by a processor, cause the processor to carry out a process for enforcing client compliance in a network address translation (NAT) environment on a network, the process comprising:
    storing non-compliance data in a NAT device, the non-compliance data including identifiers of non-compliant devices within the NAT environment behind the NAT device;
    receiving a query at the NAT device as to a compliance status of a target device within the NAT environment, the query including an identifier of the target device;
    determining compliance status of the target device within the NAT environment based on the non-compliance data and the identifier of the target device; and
    responsive to determining a status of non-compliance for the target device within the NAT environment, reporting an identifier of the NAT device to an upstream client compliancy system indicating non-compliance of the NAT device.

13. The machine-readable medium of claim 12, the process further comprising:
    in response to determining that the target device is compliant, assigning the target device to a protected network coupled to the NAT device.

14. The machine-readable medium of claim 12, the process further comprising:
    in response to determining that the target device is non-compliant, assigning the target device to a quarantined network coupled to the NAT device; and
    taking remedial steps to eliminate non-compliancy.

15. The machine-readable medium of claim 14, further comprising:
    removing the target device from a NAT device database in response to completing the remedial steps to eliminate the non-compliancy.

16. A network address translation (NAT) device for enforcing client compliance on a network, comprising:
    a processor;
    a memory comprising a database for storing non-compliance data, the non-compliance data including identifiers of non-compliant devices within the NAT environment behind the NAT device; and
    a computer readable storage medium storing program code executable by the processor, the program code including a compliance verification component that when executed causes the processor to perform steps including:
        receiving a query as to a compliance status of a target device within the NAT environment, the query including an identifier of the target device;

determining compliance status of the target device within the NAT environment based on the non-compliance data stored in the database and the identifier of the target device; and responsive to determining a status of non-compliance for the target device within the NAT environment, reporting an identifier of the NAT device to an upstream client compliancy system indicating non-compliance of the NAT device.

17. The device of claim 16 wherein the NAT device is further configured with VLAN capability for segregating compliant and non-compliant devices.

18. The device of claim 16 wherein determining compliance status of the target device by the compliance verification component includes comparing the identifier included in the query against identifiers in the database.

19. The device of claim 16, wherein the compliance verification component further includes program code that when executed cause the processor to perform steps of:

assigning the target device to a quarantined network coupled to the NAT device in response to determining that the target device is non-compliant; and taking remedial steps to eliminate non-compliancy.

20. The device of claim 19, wherein the compliance verification component further includes program code that when executed cause the processor to perform a step of:

removing the target device from a NAT device database in response to completing the remedial steps to eliminate the non-compliancy.

* * * * *